United States Patent [19]
Gutowski et al.

[11] Patent Number: 5,648,109
[45] Date of Patent: Jul. 15, 1997

[54] APPARATUS FOR DIAPHRAGM FORMING

[75] Inventors: Timothy G. Gutowski, Newton, Mass.; Gregory P. Dillon, Erie, Pa.; Sukyoung Chey; Haorong Li, both of Cambridge, Mass.

[73] Assignee: Massachusetts Institute of Technology, Cambridge, Mass.

[21] Appl. No.: 433,125

[22] Filed: May 3, 1995

[51] Int. Cl.⁶ .................................................. B29C 70/44
[52] U.S. Cl. .......................... 425/504; 156/212; 156/223; 156/382; 156/475; 264/314; 425/389; 425/DIG. 44
[58] Field of Search ........................... 425/389, 390, 425/504, DIG. 44; 264/314; 156/212, 223, 382, 475

[56] References Cited

U.S. PATENT DOCUMENTS

| | | | |
|---|---|---|---|
| 3,614,811 | 10/1971 | Johnson | 425/DIG. 19 |
| 3,938,361 | 2/1976 | Claesson et al. | 72/63 |
| 4,079,613 | 3/1978 | Syvakari | 72/63 |
| 4,163,378 | 8/1979 | Hellgren | 72/63 |
| 4,475,976 | 10/1984 | Mittelstadt et al. | 425/389 |
| 4,559,797 | 12/1985 | Raymond | 72/63 |
| 4,576,776 | 3/1986 | Anderson | 425/389 |
| 4,608,220 | 8/1986 | Caldwell et al. | 425/389 |
| 4,658,618 | 4/1987 | Hellgren | 425/389 |
| 4,676,086 | 6/1987 | Hellgren | 425/389 |
| 4,693,103 | 9/1987 | Hellgren | 72/63 |
| 4,715,923 | 12/1987 | Knoll | 425/DIG. 19 |
| 4,765,166 | 8/1988 | Bergman et al. | 425/389 |
| 4,875,962 | 10/1989 | Breakspear | 264/314 |
| 5,037,599 | 8/1991 | Olson | 425/389 |
| 5,108,532 | 4/1992 | Thein et al. | 425/390 |
| 5,139,405 | 8/1992 | Krone et al. | 425/116 |
| 5,145,621 | 9/1992 | Pratt | 156/382 |
| 5,156,795 | 10/1992 | Harvey et al. | 264/316 |
| 5,173,314 | 12/1992 | Hosoi | 425/389 |
| 5,328,540 | 7/1994 | Clayton et al. | 156/285 |
| 5,380,480 | 1/1995 | Okine et al. | 264/316 |
| 5,468,331 | 11/1995 | Makarenko et al. | 425/504 |

FOREIGN PATENT DOCUMENTS

| | | | |
|---|---|---|---|
| 1022783 | 1/1958 | Germany | 156/382 |
| 62-37134 | 2/1987 | Japan | 264/314 |

OTHER PUBLICATIONS

"Diaphragm Forming: Innovation and Application to Ocean Engineering", Master's Thesis of Gilles Langlois, Dept. of Ocean Engineering, MIT, Cataloged May 4, 1995.

T.G. Gutowski et al., "Presentation: Laminate Wrinkling Scaling Laws for Ideal Composites", Jul. 7–9, 1994.

*Primary Examiner*—Robert Davis
*Attorney, Agent, or Firm*—Wolf, Greenfield & Sacks, P.C.

[57] ABSTRACT

Apparatus and methods for forming an article of advanced composites on a tool forming surface from a preform are disclosed. Apparatus includes, according a preferred embodiment, a tool forming surface, a first diaphragm for urging a preform into conforming contact with the tool forming surface, and a second diaphragm for supporting a side of the preform opposite the side engaged by the first diaphragm during forming. The second diaphragm does not extend completely between the preform and the tool forming surface. The apparatus is arranged with a first diaphragm mountable on the apparatus and conformable to a preform to be formed and a second diaphragm mounted on the apparatus and conformable to a portion of the preform simultaneously with the first diaphragm. A forming tool is provided, including a tool forming surface positionable for receiving the preform between the first diaphragm and the second diaphragm when the first and second diaphragms are mounted on the apparatus.

41 Claims, 5 Drawing Sheets

APPARATUS FOR DIAPHRAGM FORMING

This invention was made with government support under Grant Number DDM-9114778 awarded by the National Science Foundation. The government has certain rights in the invention.

FIELD OF THE INVENTION

The present invention relates generally to the production of structural components by tool forming of advanced composites, and more particularly to apparatus and methods for diaphragm forming of a preform directly onto a tool forming surface, allowing successive diaphragm forming of individual layers of a laminate article on a forming tool, without trapping a diaphragm between the part and the tool.

BACKGROUND OF THE INVENTION

Composite or laminate articles formed of materials such as fibrous thermoset or thermoplastic materials are important to many industries, particularly the aircraft, transportation, and sporting industries, due to their high strength-to-weight and high stiffness-to-weight ratios. These articles can be formed of preforms that are shaped against a forming tool, and then solidified. Preforms typically are made up of individual layers of prepreg, that is, thermoset or thermoplastic resin containing embedded, aligned, and/or interlaced (e.g., woven or braided) fibers such as carbon fibers. The number of layers in a preform (and the preform's thickness) often is dictated by the strength and stiffness required of the resultant article. The layers typically are stacked such that the fibers of the various layers are oriented in a variety of directions, resulting in the desired stiffness of the shaped article in several directions, e.g., $[0°/90°/±45°]_s$.

Formation of a preform on a tool forming surface can be problematic, however, due to compression in portions of the preform which can lead to buckling and wrinkling of the preform. This problem is especially likely when a preform is formed against a tool surface having double curvature. The difficulty of formation increases as the thickness of the preform increases, thus formation of doubly curved articles made up of many layers can be difficult.

If a planar multi-layer preform is to conform to a non-planar surface, deformation modes such as, inter-layer slippage (or shear), intra-layer slippage and transverse shear must occur to accommodate the complex shape and to alleviate the forces induced during formation. That is, layers of the preform must be made to slide relative to each other, and fibers within a layer must be made to slide (both longitudinally and transversely) relative to each other. If some of these or other in-plane deformation modes cannot be achieved, then the preform will possibly undergo buckling. If these modes can be achieved, then generally an article of double curvature can be formed that does not wrinkle or buckle, especially out of the plane of the article.

To form laminate articles of double curvature that are free of wrinkles, a hand lay-up process can be employed in which individual layers of prepreg material are placed manually ply by ply over a tool including a forming surface having a desired shape. This process, however, is very labor intensive.

An alternative method for forming such articles involves double diaphragm forming. This involves sandwiching a flat preform, defined by several layers of prepreg, between two diaphragms. The space between the diaphragms is evacuated, pressure is applied to one side of the arrangement (and/or vacuum to the other side) while the arrangement is adjacent a tool having a forming surface to which the preform is desirably conformed. The arrangement is set at a temperature at which the preform can achieve the shear modes described above, and the preform is deformed into the shape of the forming surface. The formed article then is removed from between the diaphragms.

Prior art methods of double diaphragm forming, however, suffer significant drawbacks. For example, after forming, one of the diaphragms (the "internal" diaphragm) is trapped between the part and the tool on which the part is formed. This can be problematic. During the forming of thermoset composites, elastomeric diaphragms that typically are used in the process are generally both relatively thick and compliant. Hence to insure high dimensional fidelity, it may be necessary to add an additional step to the process, whereby the trapped diaphragm is removed and the part is placed on a curing tool. In addition, the presence of the "internal" diaphragm for the double diaphragm processes prohibits the use of diaphragm forming as a sequential processes, whereby several layers are formed successively building up to a total desired thickness. The advantage of the sequential process is that it significantly increases the range of part size and degree of double curvature which can be formed.

SUMMARY OF THE INVENTION

The present invention provides methods and apparatus for forming an article from a preform on a forming tool, using diaphragms on each side of the preform, which does not result in one of the diaphragms becoming trapped between the article and the forming tool.

According to one aspect, a preform is placed on a tool forming surface of a forming tool with one side of the preform facing the forming tool and an opposite side facing away from the forming tool. The preform is positioned on the forming tool such that one portion is adjacent the tool forming surface, while a second portion of the preform deviates from the tool forming surface. Each side of the portion of the preform that deviates from the tool forming surface is engaged by a diaphragm, and then the deviating portion of the preform is formed into conforming contact with the tool forming surface of the forming tool. This can be accomplished, according to one embodiment, by using a first diaphragm to apply a pressure to the portion of the preform that deviates from the forming tool on the side facing away from the forming tool, while simultaneously applying a lesser pressure to the other side of the preform at the deviating portion. The lesser pressure is sufficient to support the preform to the extent that the preform does not undergo out-of-plane wrinkling during forming. The first diaphragm is allowed to urge the portion that deviates from the forming tool toward the tool forming surface, while the second diaphragm is gradually withdrawn from a region between the tool forming surface and the side of the deviating portion of the preform that faces the tool forming surface. The second diaphragm is withdrawn until the deviating portion of the preform is brought into conforming contact with the tool forming surface, via the first diaphragm.

According to one embodiment, either of the first or second diaphragms (or both) can be made to engage the preform by inflating at least one inflatable member behind the diaphragm. That is, an inflatable member can engage a diaphragm, which can in turn engage the preform. This allows for controlled engagement of specific, predetermined regions of the preform.

Once the preform has been made to conform to the tool forming surface, a second preform can be laminated onto the first preform by treating the outward-facing surface of the first preform as a tool forming surface and repeating the steps described above. Any number of preforms can be laminated successively in this manner, and the result is a laminate, composite article of any desired thickness, formed into the shape of the tool forming surface, without wrinkling. Additionally, multiple single preforms, or even multiple single layers or prepregs, can be shaped on a tool-forming surface for high-speed production. Although the method can be employed on a tool having a forming surface of any geometrical configuration, the method is especially useful when the tool forming surface has double curvature.

Additionally, once the preform (or successively-formed preform layers defining a laminate article) is shaped on the tool forming surface, it can be cured thereon, which is desirable in many circumstances, especially with thermosets.

According to another aspect, the invention involves positioning a preform in proximity of a tool forming surface with a first portion of the preform adjacent the tool forming surface and a second portion deviating from the tool forming surface, engaging the side of the preform that faces away from the tool with one diaphragm, and engaging the side of the preform that faces the tool with another diaphragm that does not extend between the forming tool and the portion of the preform adjacent the forming tool. The preform then is formed into conforming contact with the tool forming surface.

According to another aspect, the invention involves forming a preform over a forming tool having double curvature. The preform has a first side and a second side, and the forming step is carried out by placing a diaphragm over the second side of the preform opposite the tool forming surface, and covering only a selected peripheral portion of the preform at the first side with another diaphragm limited to areas of the preform deviating from the tool forming surface.

The invention also provides apparatus that can be used to carry out the above and other methods. According to one aspect, the apparatus includes a diaphragm mounted thereon and conformable to a portion of a preform, another diaphragm mountable on the apparatus and conformable to the preform simultaneously with the first diaphragm, and a forming tool having a tool forming surface positionable for receiving the preform between the diaphragms. The entire tool can be positioned between the diaphragms in some embodiments. The apparatus can include a workspace that contains the forming tool surface, or that contains the entire forming tool, and the first and second diaphragms can be inflated into the workspace. According to one embodiment, the apparatus includes a lower support for supporting the forming tool, and an upper support mounted in opposed relationship with the lower support. One of the diaphragms can be pneumatically sealable to the upper support and the other diaphragm can be pneumatically sealable to the lower support. According to another embodiment, the apparatus includes a support for supporting the forming tool where one of the diaphragms is pneumatically sealable to the support and pneumatically sealable to the other diaphragm. According to another embodiment, the apparatus includes a first diaphragm having a surface that is conformable to the preform, and a second surface opposite the first surface that is pneumatically isolable from the tool forming surface. A second diaphragm includes a surface conformable to the preform and a second surface opposite the first surface that is pneumatically isolable from the tool forming surface. The surfaces of the diaphragms that are conformable to the preform, together with the tool forming surface, define in part a region that can be isolated pneumatically, that is, a pneumatically isolable cell. One or more inflatable members can be provided that can engage the surfaces of the diaphragms opposite the surfaces conformable to the preform.

According to another aspect of the invention, apparatus is provided that includes a forming tool having a tool forming surface for receiving a preform to be formed thereon, and a diaphragm. The diaphragm has a forming surface that is conformable to a preform mounted on the tool forming surface and a second surface opposite the forming surface. The apparatus includes at least one inflatable member that can be inflated against the second surface of the diaphragm.

Other advantages, novel features and objects of the invention will become apparent from the following detailed description of the invention when considered in conjunction with the accompanying drawings which are schematic and which are not necessarily drawn to scale.

DETAILED DESCRIPTION OF THE INVENTION

Figure 1:
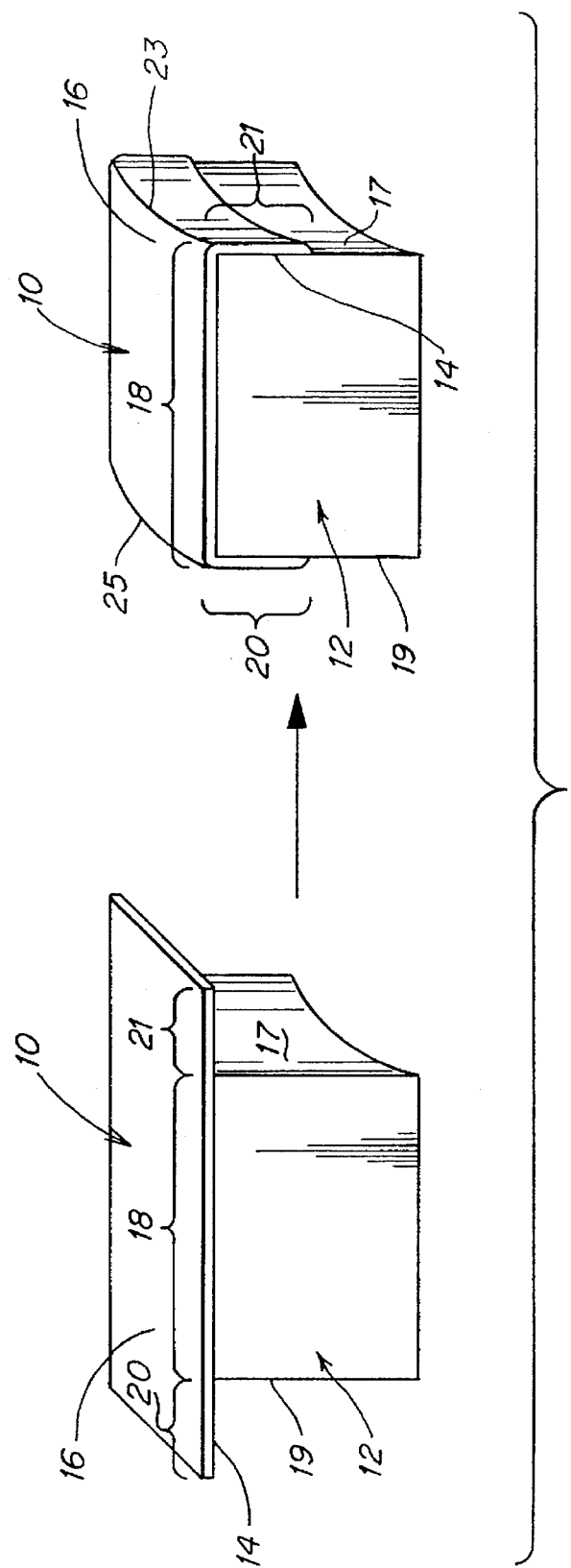
FIG. 1 illustrates the formation of a substantially planar preform onto a double curvature tool forming surface in accordance with one embodiment of the invention, with apparatus used to carry out the forming step omitted for purposes of clarity.

The present invention provides apparatus and methods for forming preforms on forming tools, with diaphragms. The invention according to one aspect provides for support of portions of a preform that deviate (overhang) from a tool forming surface that otherwise would drape disadvantageously. The invention is especially useful in the formation of multi-layer thermoset preforms directly on a tool forming surface, followed by curing of the thermoset article directly on the tool and/or formation of additional plies of preform onto the originally-formed article. The invention solves certain prior art complications. One complication in a prior art method involves a preform sandwiched between two diaphragms, each completely covering one side of the preform, the arrangement being formed as such on a tool forming surface. The article must then either be lifted off of a diaphragm that is trapped between it and the tool forming surface and removed to a second tool for curing, or, after removal of the top diaphragm, article, and lower diaphragm from the tool forming surface, if the article is to be returned to the original tool forming surface for curing, problems in dimensional stability can arise. The present invention addresses these problems. An advantage to forming a preform directly onto a tool surface is that if a diaphragm is not trapped between the article and the forming surface, certain problems with dimensional stability of the surface can be avoided.

Diaphragms for forming articles of the type described herein are known. Preferred diaphragms for forming thermoset articles are elastomeric, and have a softening temperature higher than the forming temperature of the preform with which they are used. Exemplary materials suitable for use as diaphragms in the invention, especially with thermoset preforms, include silicon rubber and latex rubber. Exemplary materials suitable especially with thermoplastic preforms include polyimides (for example KAPTON or UPILEX polyimides), polyetherimides (for example ULTEM polyetherimides), superplastic aluminum, and the like. Preferred as diaphragms of the invention with thermoset preforms are 1/16 inch thick silicone rubber sheet of 50±5 Durometer, or 0.020 inch thick latex sheet, both available from Aero Rubber Company, Bridgeview, Ill.

A variety of preforms can be shaped according to the invention. Generally, a preform is defined by layers of prepreg, that is, layers of thermoset or thermoplastic resin containing embedded fibers, for example fibers of carbon, glass, silicon carbide, and the like. Preferred thermoset materials include epoxy, rubber strengthened epoxy, BMI, PMK-15, polyesters, vinylesters, and the like, and preferred thermoplastic materials include polyamides, polyimides, polyarylene sulfide, polyetherimide, polyesterimides polyarylenes polysulfones polyethersulfones polyphenylene sulfide, polyetherimide, polypropylene, polyolefins, polyketones, polyetherketones, polyetherketoneketone, polyetheretherketones, polyester, and analogs and mixtures thereof. Typically, each layer (prepreg) includes fibers that are aligned and/or interlaced (woven or braided) and the prepregs are arranged such the fibers of many layers are not aligned with fibers of other layers, the arrangement being dictated by directional stiffness requirements of the article to be formed by the method. The fibers generally can not be stretched appreciably longitudinally, thus each layer can not be stretched appreciably in the direction along which its fibers are arranged. Exemplary preforms include TORLON thermoplastic laminate, PEEK (polyether etherketone, Imperial Chemical Industries, PLC, England), PEKK (polyetherketone ketone, DuPont) thermoplastic, T800H/3900-2 thermoset from Toray (Japan), and AS4/3501-6 thermoset from Hercules (Magna, Utah).

Preforms can be formed into articles of desired shape at a variety of temperatures. Preferably, preforms are formed at a temperature greater than the glass transition temperature of the material from which the preform is made, and at a temperature less than the degradation temperature of the material. Forming temperatures can range from those below room temperature to those well above room temperature, for example up to 350° F. and higher. Higher temperatures are generally required thermoplastic materials. The temperature at which the material is formed should also be lower than a curing temperature, if curing is carried out. For example, some preforms can be formed at room temperature and the forming step therefore is carried out at room temperature according to one embodiment. According to another embodiment, a preform is heated slightly above room temperature during forming. This is typical of embodiments involving thermoset materials. Other preforms must be heated to a greater extent. In embodiments that involve heating the preform, this can be accomplished by heating one or more diaphragms, the forming tool, the chamber in which forming takes place, or several of these using known methods. For example, radiative heat can be applied to the preform and/or diaphragms via heat lamps, a resistive heating element can be placed in thermal communication with the forming surface of the forming tool (for example in a metal forming tool), convective heating aided with, for example, a heat gun, or the like can be employed. A suitable forming temperature can be determined by, for example, hand forming a preform at room temperature or under tolerable heating conditions, and/or by commencing diaphragm forming at room temperature and gradually increasing temperature if necessary to form the preform under acceptable diaphragm pressure. A suitable forming temperature can be selected also using rheological data.

Although a single layer or prepreg can be formed in accordance with the invention, preforms used in the invention are typically defined by from about 2 to about 48, preferably from about 2 to about 12 layers, more preferably from about 4 to about 6 layers, each of thickness of about 0.005 to about 0.0010 inch, generally from about 0.006 to about 0.008 inch. A layup of several such layers defines a preform, which in turn can define a ply of a laminate article formed in accordance with the invention.

Preforms used in accordance with the invention are generally planar, but need not be. The preform can be of any shape so long as it includes at least a portion that can contact a tool forming surface while another portion deviates from a tool forming surface.

Tools for forming the article can be made of any material that does not soften unacceptably at forming temperatures. Additionally, the tool should be selected to be able to withstand pressures to which it is subjected during the forming process, and to maintain desired dimensional stability. Metal tools such as aluminum, nickel, nickel alloys, steel, and composites including graphite epoxy and ceramics are preferred. The forming surface of the tool can be made of the same material from which the bulk of the tool is made, or can be different. For example, a surface of a forming tool can be coated with a release agent or another coating to provide a smooth forming surface. For example, and especially with thermoplastic materials, the tool forming surface can be covered with a layer of material such as that from which the diaphragm is made. It is preferred, with rubber diaphragms and thermoset materials, that the article be formed directly on the tool forming surface, not the tool forming surface covered with a rubber diaphragm. Tools may include a variety of surface treatments to achieve various effects such as smoothness, non-stick, and the like. For example, the forming surface can be coated with a release agent prior to forming an article thereon. Suitable release agents are known, including Teflon™ polytetrafluoroethylene containing sprays such as Release All™ polytetraflouroethylene—containing spray from Airtech International, Inc., Carson, Calif.

Referring to FIG. 1, formation of a preform 10 on a forming tool 12 is illustrated schematically to demonstrate one object of the invention, with forming apparatus other than the tool omitted for clarity. Tool 12 is cut from an elongated bar of generally rectangular cross section, and is curved along its length. Thus, the tool 12 is a sector or portion of a ring having a rectangular cross section with a first arcuate inner wall 17 and an essentially concentric arcuate outer wall 19, the edge of which is shown in the figure. Thus, any portion of the surface of the tool that includes an edge of the rectangle is of double curvature, in that it includes one curve that defines an outer curved edge and one curve that defines the arc of wall 17 or 19. The intersection of these curves is illustrated at 23 and 25 of FIG. 1. According to the illustration, preform 10 is placed on top of tool 12 and extends beyond the top of the tool in each direction perpendicular to the length of the tool. Thus the tool has a tool forming surface that includes two edges of the rectangle. The tool forming surface is defined by the ultimate region of contact between the tool surface and preform when the preform has been made to conform to the tool surface.

In accordance with the present invention, a preform can be formed on a tool having a forming surface of any geometry, although the invention is especially useful when a tool forming surface has double curvature (complex curvature). Tool forming surfaces having any number of doubly-curved surfaces can be used in accordance with the invention to form articles having any number of doubly-curved surfaces.

Preform 10, as illustrated, is substantially planar and has a first side 14 that faces the forming tool when placed thereon, and a second side 16 opposite the first side. A first portion 18 of the preform is adjacent the tool forming surface and second portions 20 and 21 deviate from the tool forming surface. In some circumstances, portions 20 and 21 of preform 10 can droop due to the effect of gravity. This can be disadvantageous in some circumstances and, as is described more fully below, the present invention provides a solution to this problem. Preform 10 is formed to the tool forming surface by bringing the deviating portions 20 and 21 into conforming contact with the tool forming surface.

As used herein, the term "adjacent", with reference for example to a preform or portion thereof that is adjacent a tool forming surface, means that the preform is placed against the tool forming surface and can, but need not necessarily, contact the tool forming surface directly. For example, a preform that is adjacent a tool forming surface can be placed on the tool forming surface directly, or can be supported near the tool forming surface with a diaphragm, or portions of the preform can be placed in contact with the tool forming surface while other portions are separated from the tool forming surface with a diaphragm. If a preform is supported by a diaphragm that passes between it and the tool forming surface, the preform is adjacent the tool forming surface. The terms "contact" and "conforming contact" between a preform (ultimately the shaped article which the preform is made), and the tool forming surface define an arrangement in which the preform directly contacts the tool forming surface, or the article that has been shaped onto the tool forming surface is directly contacts the tool forming surface. After a preform has been formed into an article in conforming contact with a tool forming surface, a forming diaphragm does not pass between the tool forming surface and the article. This arrangement is distinguished from prior art tool-forming apparatus and methods in which a preform is sandwiched between two diaphragms, each side of the preform completely covered by a diaphragm, and then formed on a tool forming surface. According to the prior art method, a forming diaphragm then is trapped between the article and tool forming surface.

As described below, the tool forming surface need not necessarily be of the same material from which the tool is made. For example, if it is desirable to provide an optimally smooth forming surface, a diaphragm or other material may be coated on or used to cover the forming surface of a tool. The outer exposed surface of the material on the tool then defines the tool forming surface of the present invention.

It can be seen that portions of preform 10, especially portions 20 and 21 and portions in the vicinity of the edges of the tool, will be subject to stretching and compressive forces during forming, which can lead to out-of-plane wrinkling. According to the state of the art prior to the present invention, forming such an article without wrinkling, especially out-of-plane wrinkling, can be accomplished by labor-intensive hand lay-up. Alternatively, preform 10 can be made to assume a shape that essentially conforms to the shape of the tool forming surface of tool 12 via double-diaphragm forming, in which the preform is sandwiched between two diaphragms, the region between the diaphragms evacuated, and the resultant preform/diaphragm sandwich formed against the tool forming surface. According to the method, if the thickness of preform 10 is greater than a particular dimension, then wrinkling of the preform will occur even if the prior art double-diaphragm method is employed. While it would be desirable to conform a first preform on the tool forming surface, conform a second preform to the first preform, and thus build up a laminate article of desired thickness, this can not be accomplished by the known double-diaphragm method since one diaphragm would be trapped between each laminate layer.

Figure 2:
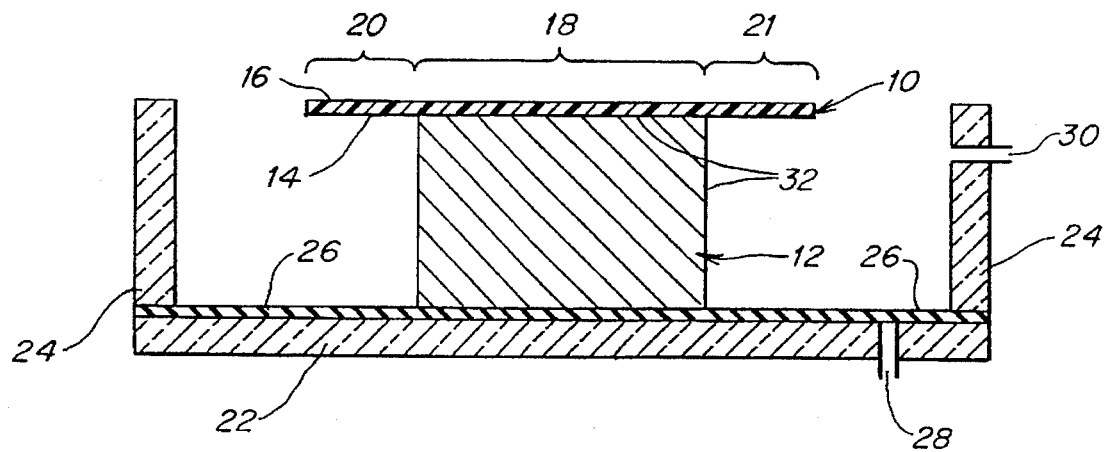
FIG. 2 illustrates apparatus for forming a preform including a lower support, sidewalls, a forming tool, and a lower diaphragm in accordance with one embodiment of the invention.

Referring now to FIG. 2, apparatus according to one embodiment of the present invention is illustrated in cross section. In the figures, each identical component that is illustrated in various figures is represented by a single numeral. For purposes of clarity, not every component is labeled in every figure. FIGS. 2–10 are in cross section, and it is to be understood that the tool illustrated in each includes the exemplary concentric inner and outer arcuate walls 17 and 19 providing curved forming edges 23 and 25, illustrated in FIG. 1.

Apparatus illustrated in FIG. 2 includes a lower support 22, side walls 24 extending upwardly from the lower support, and a diaphragm 26 proximate to the lower support and pneumatically sealed at the junction of the lower support and the side walls. Forming tool 12 is supported by lower support 22 and diaphragm 26 passes between the tool and the lower support. An aperture 28 passes through lower wall 22 to access a pneumatic cell (pressure or vacuum-tight region) defined by lower support 22 and diaphragm 26. Side wall 24 includes an aperture 30. Apertures can be connected to known sources of pressure or vacuum, such as air compressors or vacuum pumps, and can be addressed by pressure or vacuum gauges.

Preform 10 is positioned on tool forming surface 32 of forming tool 12 with its first side 14 facing the tool and its second side 16 facing away from the tool. As used herein, the term "facing" with respect to the relationship between a preform and a tool forming surface means a side of a preform that, after the forming step, contacts the tool forming surface. The term "facing away" in this context means a surface that, after forming, is not in contact with the tool forming surface.

Figure 3:
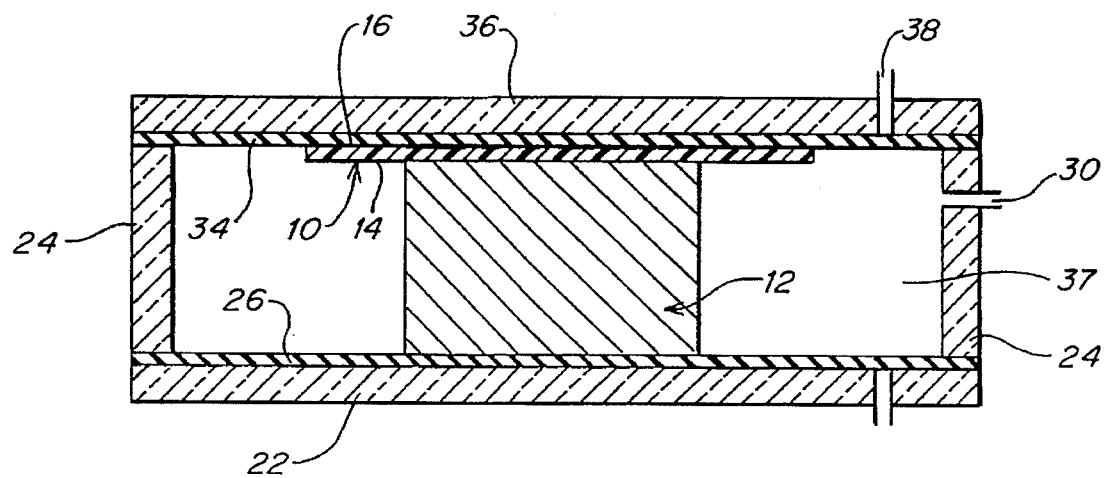
FIG. 3 illustrates, in addition to the apparatus illustrated in FIG. 2, an upper diaphragm and an upper support in accordance with one embodiment of the invention.
Figure 4:
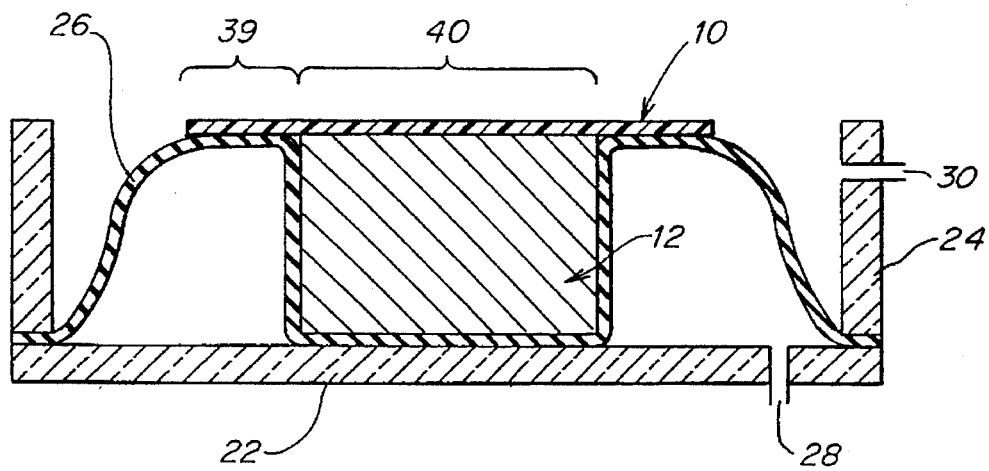
FIG. 4 illustrates the apparatus as illustrated in FIG. 2, with the bottom diaphragm inflated so as to engage portions of one side of the preform.

With reference to FIG. 3, a diaphragm 34 is positioned proximate to side 16 of preform 10 so as to extend between the sidewalls 24, and is sealed to the sidewalls. A pneumatic cell is thus defined by diaphragm 26, sidewalls 24, and diaphragm 34, which is accessed by aperture 30. An upper support 36 is attached to upper edges of sidewalls 24, which can serve to seal diaphragm 34 to the sidewalls. Upper support 36 includes an aperture 38 that addresses a pneumatic cell defined by the upper support and diaphragm 34. Upper support 36 and lower support 22 can be fastened to side walls 24 via known systems such as threaded rods (not shown) extending longitudinally through or outside the walls, diaphragms, and supports, fastened by bolts or quick-release fasteners. Diaphragms 26 and 34 can be fastened and sealed at any locations along sidewalls 24, or along the lower and upper supports, rather than at the intersections of sidewalls 24 and the lower and upper supports as shown. Upper support 36 can be positioned, according to one embodiment, so as to exert a force on preform 10, via diaphragm 34, in the direction of tool 12 to clamp the preform to the tool forming surface. A workspace 37 is defined in the apparatus illustrated in FIG. 3 in part by the upper and lower supports 36 and 22 and the sidewalls 24.

Figure 5:
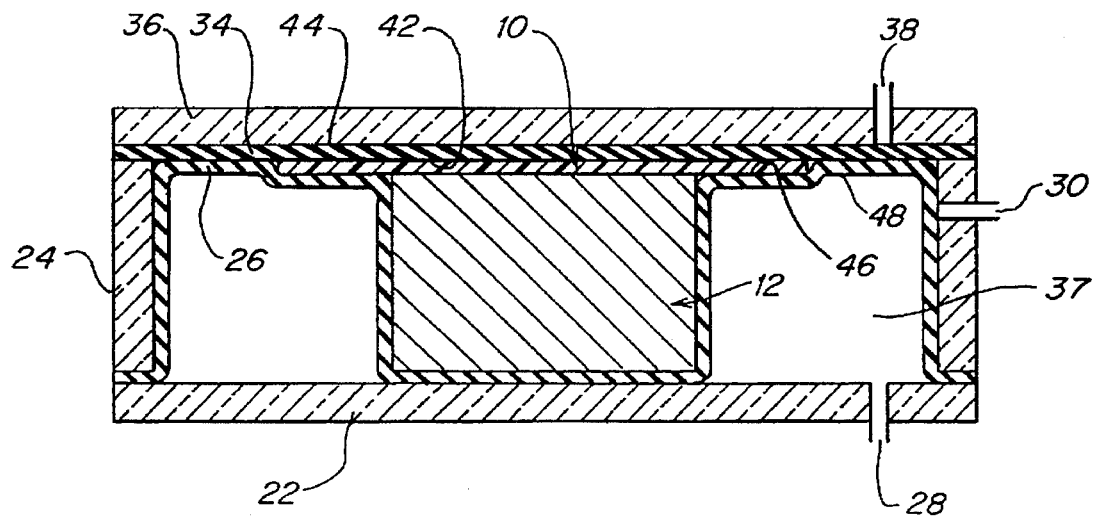
FIG. 5 illustrates the apparatus as illustrated in FIG. 3, with the lower diaphragm inflated so as to engage portions of the preform.

According to one embodiment, apparatus as illustrated in FIG. 3 is assembled prior to inflating either diaphragm to engage the preform. Alternatively, with reference to FIG. 4, prior to mounting diaphragm 34 on the apparatus, diaphragm 26 is inflated to the extent that it provides a surface 38 essentially aligned with a portion 40 of the tool forming surface, portion 38 of diaphragm 26 and portion 40 of the tool forming surface defining a supporting surface onto which the preform can be positioned. Thus, diaphragm 26 can be a supporting diaphragm. This technique is particularly advantageous when preform 10 is not stiff and would otherwise drape into conformation with the tool forming surface. Diaphragm 26 can be inflated by introducing a fluid, such as pressurized air, through aperture 28 and into the pneumatic cell defined by diaphragm 26 and lower support 22. Following placement of preform 10 on portions 38 of diaphragm 26 and portion 40 of the tool forming surface, diaphragm 34 can be placed proximate to the preform and upper support 36 fastened to side walls 24, and the resulting arrangement is illustrated in FIG. 5. The arrangement illustrated in FIG. 5 can result as well from assembly of apparatus as illustrated in FIG. 3, followed by inflation of diaphragm 26 into workspace 37.

Thus, as assembled, the apparatus illustrated in FIG. 5 includes diaphragm 26 mounted on the apparatus and conformable to preform 10, diaphragm 34 mountable on the apparatus (mounted, as illustrated) and conformable to a portion of the preform, and forming tool 12 having a forming surface positionable for receiving preform 10, between the diaphragms. Workspace 37 contains the forming tool. Diaphragm 34 includes a forming surface 42 that is conformable to preform 10, and a second surface 44 opposite forming surface 42. Forming surface 42 of diaphragm 34 defines in part a first pneumatic cell, while second surface 44 defines in part a second pneumatic cell pneumatically isolable from the first cell. Diaphragm 26 includes a forming surface 46 that is conformable to preform 10, and a second surface 48 opposite forming surface 46. Forming surface 46 defines in part, with the tool forming surface and forming surface 42 of diaphragm 34, the first pneumatic cell. Second surface 48 of diaphragm 26 defines in part a third pneumatic cell pneumatically isolable from the first pneumatic cell. The first pneumatic cell contains preform 10.

According to the embodiment illustrated in FIG. 5, lower support 22 and upper support 36 are mounted at opposing ends of sidewalls 24, the lower support supporting the tool and diaphragms 26 and 34 secured between the sidewalls and the lower and upper supports, respectively. According to this embodiment, upper support 36 defines in part the second pneumatic cell and lower support 22 defines in part the third pneumatic cell. It is to be understood, however, that the supports and sidewalls illustrated are provided according to a preferred embodiment only, that the essence of the invention is the provision of diaphragms that can support simultaneously opposing sides of a preform and cause the preform to conform to the tool forming surface without trapping one of the diaphragms between the preform and the tool forming surface, and that this arrangement in its broadest sense can be assembled without the supports and sidewalls as illustrated. For example, tool 12 could be supported by a clamp or the like, with diaphragms 26 and 34 being supported independently of the tool and of each other but such that they can be inflated into conforming contact with the portions 20 and 21 of the preform.

As described more fully below, diaphragms 26 and 34 each are inflatable into workspace 37, and forming surfaces 46 and 42 of diaphragms 26 and 34, respectively, can thereby engage portions of preform 10 simultaneously. As used herein, "inflation" is meant to define the application of a pressure differential across the diaphragm to the extent that the diaphragm moves. That is, pressurized fluid can be applied to a first side of the diaphragm while a second side is exposed to atmosphere, or the first side exposed to atmosphere while the second side exposed to vacuum, or the first side exposed to pressurized fluid while the second side is exposed to vacuum. Accordingly, with reference to FIG. 5, diaphragms 26 and 34 can be brought into conforming contact with preform 10 by introducing pressurized fluid (such as pressurized air) through apertures 28 and 38 of lower support 22 and upper support 36, respectfully, or by evacuating the region between the diaphragms via aperture 30 in side wall 24, or both. If the region between the diaphragms is to be held at atmospheric pressure, no pneumatic seal is needed between side walls 24 and either diaphragms, indeed the side walls are not needed if other support for the tool and the diaphragms is provided. According to one embodiment, diaphragm 26 is inflated via pressurized fluid through aperture 28, diaphragm 34 is brought into conforming contact with the preform by evacuating the region between the diaphragms via aperture 30, and according to this embodiment no seal is needed between the upper support 36 and diaphragm 34. Indeed the upper support is not needed according to this embodiment unless to secure the preform at a proper position relative to the tool forming surface.

With diaphragms 26 and 34 inflated (and/or the region therebetween evacuated) the diaphragms are made to engage regions of preform 10. When the diaphragms engage portions of the preform, they counteract forces that can cause wrinkling, especially out-of-plane wrinkling, of the preform. As used herein, with reference to relationship between diaphragm and preform, the term "engage" is meant to define either pressure applied perpendicularly to the preform by the diaphragm, or tensile force applied to the preform parallel to its surface by the diaphragm, or both. As a diaphragm is inflated against the preform it can expand laterally relative to the surface of the preform, thereby applying tensile force to the preform parallel to its surface via friction between the diaphragm and the preform. This can counteract compressive forces applied to the preform as it is made to bend (especially those portions or layers of a preform at or near a surface that is made concave) which compressive forces are responsible for wrinkling. Additionally, as the diaphragm is stretched against the preform it can exert a force on the preform perpendicular to the preform surface, or at least will tend to oppose a force exerted by the preform against the diaphragm. This can counteract out-of-plane deformation of a preform, that is, out-of-plane wrinkling.

When a preform is engaged by a diaphragm in accordance with the invention, the diaphragm typically contacts the preform directly. However, the term "engage" when used in this context in accordance with the invention also contemplates pressure or tension applied by the diaphragm to a surface of the preform as described above while a layer of auxiliary material resides between the diaphragm and the preform. For example, auxiliary supporting materials can include woven fabrics, wire meshes, Teflon™ sheet, or the like. Such auxiliary material can be secured to the forming surface of a diaphragm, can be placed on a preform prior to diaphragm forming, or both.

Figure 6:
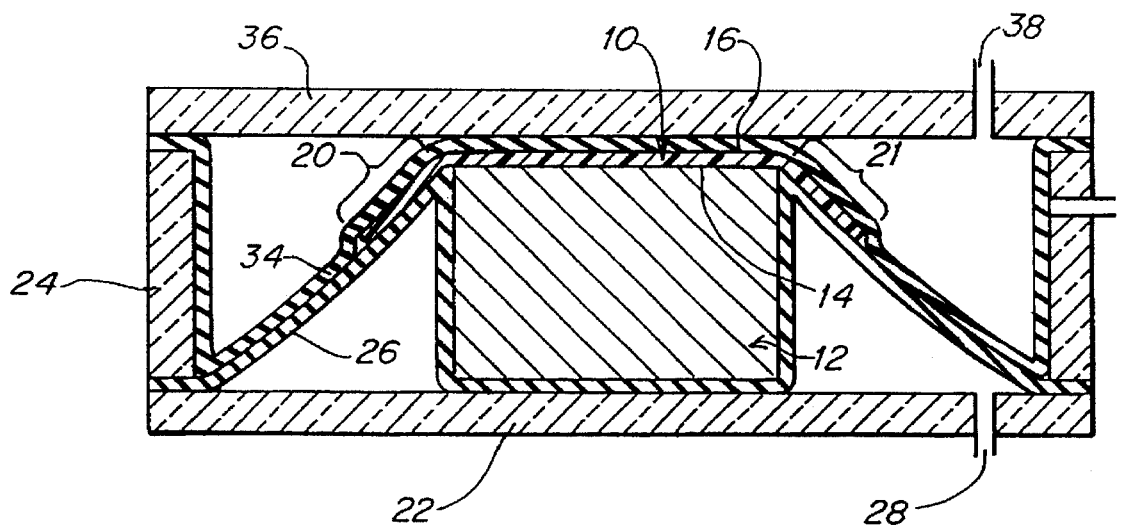
FIG. 6 illustrates apparatus as in FIG. 5, during a diaphragm forming method according to one embodiment of the invention.

Referring now to FIG. 6, formation of a preform according to the invention is illustrated. According to one embodiment, a first pressure is applied to side 16 of portions 20 and 21 of preform that deviates from the tool forming surface via diaphragm 34, while simultaneously a second pressure is applied to side 14 of deviating portions 21 and 21 via diaphragm 26. The second pressure is less than the first pressure (and can be vacuum, as described below), so portions 20 and 21 are moved toward the tool forming surface. The second pressure is sufficient, however, to support the preform to the extent that it does not undergo out-of-plane wrinkling during forming. As used herein, "support" in this context means that sufficient pressure is applied by the diaphragm in a direction perpendicular to the preform surface, and/or tension applied by the diaphragm via friction to the preform surface. "Out-of-plane" wrinkling defines formation of large wrinkles in the preform that typically are observed when preforms above a threshold thickness are made to conform to double curvature surfaces (including surfaces of double curvature), and is to be distinguished from in-plane fiber shearing and other desirable in-plane deformation modes.

The first pressure can be applied to diaphragm 34 by introducing pressurized fluid through aperture 38, connecting aperture 28 to vacuum, or both. Alternatively, a first pneumatic cell including the region between the diaphragms can be evacuated or held at atmospheric pressure, a first pressure applied to a second pneumatic cell defined by diaphragm 34 and upper support 36, and a second pressure less than the first pressure applied to a third pneumatic cell defined by diaphragm 26 and lower support 22.

The difference between the first and the second pressures should be controlled to allow gradual urging of portion 20 or 21 of the preform toward the tool forming surface, and gradual withdrawal of diaphragm 26 from below the preform, that is, from between the tool forming surface and portion 20 or 21 of the preform.

Figure 7:
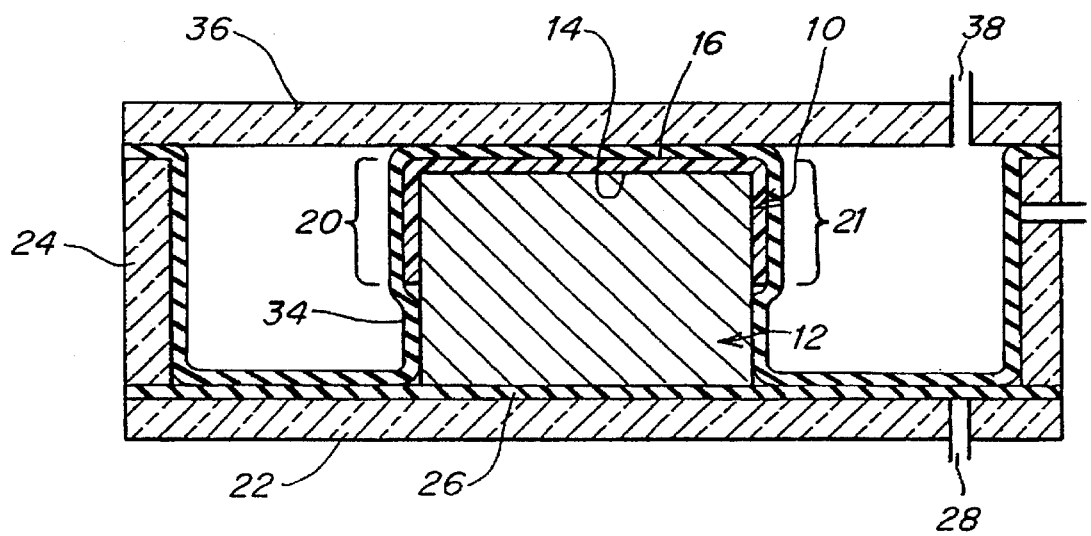
FIG. 7 illustrates a preform shaped into conforming contact with a tool forming surface, surrounded by apparatus of the invention used to shape the preform.
Figure 8:
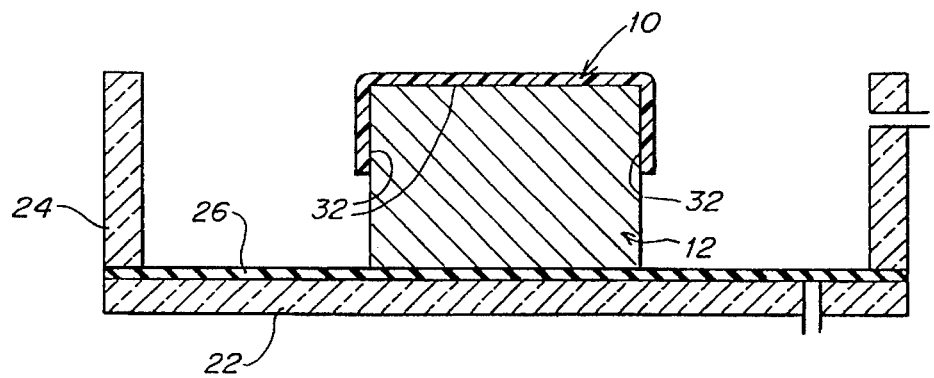
FIG. 8 illustrates a preform shaped into conforming contact with a tool forming surface in accordance with the invention, after removal of the upper diaphragm and upper support, which is suitable as a base for lamination of additional preforms thereon.

FIG. 7 illustrates the completion of the method according to one embodiment, where diaphragm 26 has been withdrawn from the preform, and portions 20 and 21 have been made to conform to the tool forming surface. Upper support 36 and diaphragm 34 can then be removed, as illustrated in FIG. 8, and the article that was shaped from the preform removed. Alternatively, according to one preferred embodiment, the article can be cured directly on the tool, if desired, by for example heating the tool to a curing temperature for a period of time sufficient to cure the article, using known heating apparatus such as that described above.

According to another embodiment of the invention, preform 10 can be left on the tool and a second preform is laminated to preform 10. According to this method, the first preform is treated as the tool forming surface and the steps described above are repeated. That is, a second preform is placed on preform 10, the second preform having a first side facing the first preform and a second side opposite the first side. The second preform has a first portion adjacent the first preform and a second portion that deviates from the first preform. The second side of the second portion of the second preform is engaged with the first diaphragm, the first side of the second portion of the second preform is engaged with the second diaphragm, and the second portion of the second preform is laminated to the second portion of the first preform. The first and second preforms define thereby first and second plies, respectively, of a laminate article. The procedure can be repeated until a laminate article of desired thickness is obtained. The laminate article can be cured directly on the tool. In known methods of double diaphragm forming in which a layer or preform is sandwiched completely between two diaphragms and the sandwich formed onto the surface of a forming tool, if an attempt is made to successively laminate layers preforms in this manner a diaphragm will be trapped between each layer or preform.

FIGS. 5–7 illustrate formation of a preform onto a tool forming surface in accordance with a preferred embodiment of the present invention in which the first side 14 of the preform is engaged with diaphragm 26 without diaphragm 26 lying completely between the preform and the tool. In accordance with other embodiments (not shown) diaphragm 26 can extend completely between the tool and preform 10, but be withdrawn as described with reference to FIG. 6 during the forming process so that the preform ultimately is in conforming contact with the tool forming surface. For example, if a preform is to be made to conform to a dome-shaped tool forming surface in accordance with the invention, one or more diaphragms may be laid on the dome in a manner such that they fold upon themselves to completely or almost completely cover the dome and to be withdrawable from the surface of the dome during forming, resulting in the preform being in conforming contact with the dome shaped surface.

Figure 9:
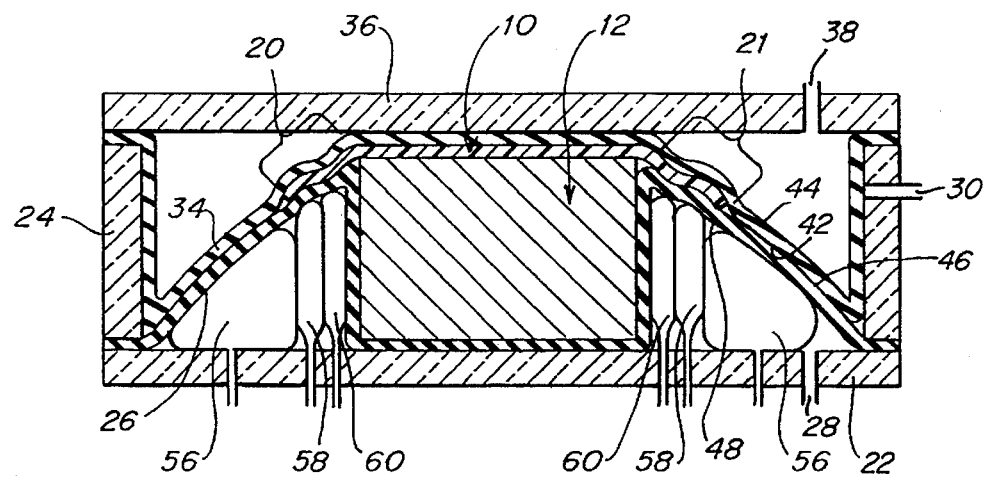
FIG. 9 illustrates the forming process of the invention as illustrated in FIG. 6, with the addition of certain inflatable members engaging the lower diaphragm.

Referring now to FIG. 9, another aspect of the present invention is illustrated, in which one or more inflatable members 56, 58 and 60 are inflatable against second surface 48 of diaphragm 26 to engage diaphragm 26. As used herein, the term "engage" in the context of an inflatable member engaging a diaphragm is meant to define pressure exerted in a direction perpendicular to the surface of the diaphragm, or tension applied parallel to the surface of the diaphragm that is generated by friction between the inflatable member and the diaphragm as the inflatable member is inflated, or both. The inflatable members can be inflated and deflated through apertures in lower support 22. Apparatus illustrated in FIG. 9 is useful when it is desirable to control the forming of portions 20 and 21 of preform 10 against the forming surface of forming tool 12 in a controlled manner. For example, members 60 most proximate to the tool can be deflated first, followed by deflation of members 58, and finally deflation of members 56. Alternatively, these steps can be reversed. Inflatable members also can be provided (not shown) adjacent second surface 44 of diaphragm 34, instead of or in addition to inflatable members 56, 58, and 60. According to these embodiments, precise control of the forming of preform 10 against the tool forming surface can be achieved. Inflation and deflation of the individual inflatable members can be controlled manually, or can be computer-controlled.

If computer-controlled, an open-loop control can inflate and/or deflate the balloons in a pre-set manner or sequence, or a closed-loop control can be effected, along with sensors positioned to sense the pressure in each member, the position of each member, the positions of diaphragms 26 and/or 34, and/or the precise shape of preform 10. Shaping of preform 10 in a pre-designed manner can in this way be achieved. Those of skill in the art can construct such computer-controlled systems including sensors. The inflatable members can be constructed of the same material from which the diaphragms are constructed, or different material, so long as the inflatable members do not soften unacceptably at the forming temperature of preform 10. The inflatable members illustrated in FIG. 9 can find application in any embodiment of the invention, and in addition in any diaphragm-forming apparatus. For example, it may be advantageous in many situations in which a preform is shaped against a tool with a single diaphragm to engage the side of the diaphragm opposite the preform with one or more inflatable members for precise control of forming.

Figure 10:
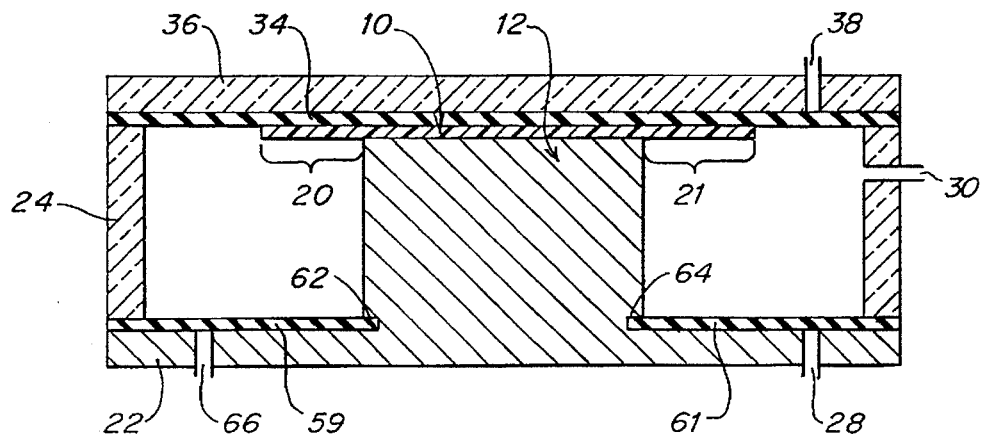
FIG. 10 illustrates the double diaphragm forming apparatus of the invention according to another embodiment.

Referring now to FIG. 10, another embodiment of the invention is illustrated in which diaphragm 26 is defined by two portions 58 and 60, respectively. Diaphragms (or portions) 58 and 60 do not extend between support 22 and tool 12, but sealingly engage tool 12 at locations 62 and 64, respectively. Locations 62 and 64 are spaced from the tool forming surface of tool 12. As illustrated, an aperture 66 in lower support 22 addresses diaphragm 58, while aperture 28 addresses diaphragm 60, although aperture 66 may not be necessary if the pneumatic cell defined by diaphragm 60 and lower support 22 is in fluid communication with a pneumatic cell defined by diaphragm 58 and lower support 22. That is, a single pneumatic cell may be defined by diaphragms 58 and 60 and lower support 22. Diaphragms 58 and 60 may be sealed to tool 12 (or lower support 22) at locations 62 and 64, respectively, by known means, such as a U-shaped, flanged sealing ring as described in U.S. Pat. No. 4,658,618 to Hellgren, incorporated herein by reference. In the embodiment illustrated in FIG. 10, the tool forming surface is located between diaphragm 34 and on the one hand diaphragm 58, and on the other hand diaphragm 60, but the tool is not disposed between the various forming diagrams in the same manner as in the embodiments illustrated in FIGS. 2–9. FIG. 10 illustrates but one alternate embodiment in which diaphragms are mounted so as to be engageable with portions 20 and 21 of preform 10. Other alternate embodiments are contemplated as well that are consistent with the essence of the invention as described above. For example, diaphragm 34 can be composed of separate portions, or separate diaphragms expandable from top support 36.

The invention also can be practiced by providing a lower support, a diaphragm on the lower support, a preform on the diaphragm, a tool on top of the preform such that portions of the preform extend from under the tool, and a second diaphragm positioned to contact portions of the preform that extend from under the tool. This can be envisioned by viewing FIGS. 5–7 upside-down. This embodiment can be advantageous when the effect of gravity on the preform is great, and drooping of portions of a preform that extend over a tool would be a significant complication. Indeed, the method of the invention could be practiced in any orientation. That is, with reference to the figures, the arrangement could be rotated to any extent so that the preform would be formed sideways on the tool, etc.

Additionally, the apparatus and the method of the invention can be combined with prior art "sandwich" double diaphragm forming. For example, a preform can be positioned between two diaphragms, each side of the preform completely covered by a diaphragm, and this arrangement can be formed on a tool in combination with a supporting diaphragm in accordance with the invention. For example, with reference to FIG. 5, this would involve an additional diaphragm (not shown) passing between diaphragms 26 and 34 and passing completely between preform 10 and tool 12. Thus, preform 10 would be sandwiched between diaphragm 34 and the additional diaphragm (not shown), and this arrangement would be made to conform to tool 12 with the aid of supporting diaphragm 26, as illustrated in FIGS. 6 and 7.

The function and advantage of the above and other embodiments of the present invention will be more fully understood from the example below. The following example is intended to illustrate the benefits of the present invention, but does not exemplify the full scope of the invention.

EXAMPLE 1

A forming tool made of (specific material) was in the form of an elongated bar of generally rectangular cross-section, curved along its length to define a sector or portion of a rim having a rectangular cross-section with arcuate inner and outer essentially concentric walls. The tool was shaped essentially as illustrated in FIG. 1, having a top width of two inches corresponding to portion 18 of preform 10 in FIG. 1, and a height of four inches. The radius of curvature of arcuate walls 17 and 19 was approximately four feet. The length of the tool was approximately 1.5 feet.

A preform was laid up of four plies of thermoset material, available as AS4/3501-6 from Hercules of Magna, Utah. The preform was approximately 12 inches by six inches and had a thickness of about 0.0064 inch. A Teflon™ release agent was applied to the surface of the tool, specifically, Release All™ from Airtech International, Inc., Carson, Calif.

Referring now to FIG. 3, a chamber was constructed of upper, lower, and side walls of polymethylmethacrylate. A diaphragm made of Latex of 1/50 inch thickness, available from Aero Rubber Company, Bridgeview, Ill. was mounted at the bottom of the apparatus and sealed to the side walls via rubber gasket material. The forming tool was placed on top of the lower diaphragm. The preform was placed on the top of the forming tool, over which was placed an upper diaphragm silicone rubber of 1/16 inch thickness, also from Aero Rubber Company. The upper diaphragm was sealed between the side and upper walls by rubber gasket material. The chamber was fastened together with threaded rods passing outside of the side walls, passing through the diaphragms and upper and lower plates, fastened by bolts above and below the plates. The region between the diaphragms can be evacuated but was not in this example. A pneumatic cell defined by the space between the lower diaphragm and the bottom support was connected to a source of pressure, specifically air at 6–10 psig.

First, prior to assembly of the upper diaphragm and upper support to the apparatus, the lower diaphragm was inflated (see FIG. 4) so that portions of the lower diaphragm were essentially in line with the top of the forming tool. The preform then was placed atop the tool and lower diaphragm. After assembly of the upper diaphragm and upper plate to the apparatus, the region between the two diaphragms was evacuated. Pressure was applied to a pneumatic cell defined between the upper support and upper diaphragm (through aperture 38, FIG. 5) while pressure was released from the region below the lower diaphragm through aperture 28. The process took place at room temperature. Specifically, the pressure above the upper diaphragm was increased to 6–10 psi, while the pressure below the lower diaphragm was decreased to ambient, gradually until the preform was shaped against the tool forming surface as illustrated in FIG. 7. The forming process took place over the course of 1–2 minutes. In other examples the pneumatic cell defined between the lower support and the lower diaphragm was connected to a vacuum pump, specifically a Pressovac 4 vacuum pump from Central Scientific Co. Chicago, Ill., to aid in withdrawal of the lower diaphragm. The upper support and upper diaphragm were removed, as illustrated in FIG. 8, and the process was repeated 4 times to form a laminate article.

Those skilled in the art would readily appreciate that all parameters listed herein are meant to be exemplary and that actual parameters will depend upon the specific application for which the methods and apparatus of the present invention are used. For example, although multi-layer preforms are described predominantly above, the invention contemplates formation of an individual layer of any formable material on a tool, optionally followed by lamination of additional layers to the formed layer, and/or curing of the layer(s) directly onto the tool. It is, therefore, to be understood that the foregoing embodiments are presented by way of example only and that, within the scope of the appended claims and equivalents thereto, the invention may be practiced otherwise than as specifically described. For example, the apparatus and methods of the invention can be used to form toys, decorations, and any other articles shaped of preforms.

What is claimed is:

1. Apparatus for forming an article on a surface of a forming tool, comprising:

a first diaphragm mountable on the apparatus and conformable to a preform to be formed;

a second diaphragm mounted on the apparatus and conformable to a portion of the preform simultaneously with the first diaphragm;

a forming tool having a tool forming surface positionable for receiving a preform to be formed thereon, the apparatus constructed and arranged for securing the preform on the tool forming surface between the first diaphragm and the second diaphragm prior to forming the preform against the tool forming surface when the first diaphragm and second diaphragm are mounted on the apparatus.

2. Apparatus as in claim 1, further comprising a workspace containing the forming tool surface, wherein the first diaphragm and second diaphragm each are inflatable into the workspace.

3. Apparatus as in claim 1, further comprising a workspace containing the forming tool, wherein the first diaphragm and second diaphragm each are inflatable into the workspace.

4. Apparatus for forming an article on a surface of a forming tool, comprising:

a first diaphragm mountable on the apparatus and conformable to a preform to be formed;

a second diaphragm mounted on the apparatus and conformable to a portion of the preform simultaneously with the first diaphragm;

a forming tool having a tool forming surface positionable for receiving a preform to be formed thereon between the first diaphragm and the second diaphragm when the first diaphragm and second diaphragm are mounted on the apparatus; and a lower support for supporting the forming tool and an upper support mounted in opposed relationship with the lower support, the first diaphragm being pneumatically sealable to the upper support and the second diaphragm being pneumatically sealable to the lower support.

5. Apparatus for forming an article on a surface of a forming tool, comprising:

a first diaphragm mountable on the apparatus and conformable to a preform to be formed;

a second diaphragm mounted on the apparatus and conformable to a portion of the preform simultaneously with the first diaphragm;

a forming tool having a tool forming surface positionable for receiving a preform to be formed thereon between the first diaphragm and the second diaphragm when the first diaphragm and second diaphragm are mounted on the apparatus; and a support for supporting the forming tool, the second diaphragm being pneumatically sealable to the support and pneumatically sealable to the first diaphragm.

6. Apparatus as in claim 5, wherein the support is a lower support, the apparatus further comprising an upper support mounted in opposed relationship with the lower support.

7. Apparatus for forming an article on a surface of a forming tool, comprising:

a first diaphragm mountable on the apparatus and conformable to a preform to be formed;

a second diaphragm mounted on the apparatus and conformable to a portion of the preform simultaneously with the first diaphragm;

a forming tool having a tool forming surface positionable for receiving a preform to be formed thereon between the first diaphragm and the second diaphragm when the first diaphragm and second diaphragm are mounted on the apparatus, wherein the first diaphragm includes a first surface that is conformable to a preform and a second surface opposite its first surface that is pneumatically isolable from the tool forming surface, the second diaphragm includes a first surface that is conformable to a preform and a second surface opposite its first surface that is pneumatically isolable from the tool forming surface, and the first surface of the first diaphragm, the first surface of the second diaphragm, and the tool forming surface together define in part a pneumatically isolable cell.

8. Apparatus as in claim 1, wherein the tool forming surface of the forming tool is nonplanar.

9. Apparatus as in claim 1, wherein the tool forming surface of the forming tool has double curvature.

10. Apparatus for forming an article on a surface of a forming tool, comprising:

a first diaphragm mountable on the apparatus and conformable to a preform to be formed, the first diaphragm having a first side for engaging the preform and a second side opposite the first side;

a second diaphragm mounted on the apparatus and conformable to a portion of the preform simultaneously with the first diaphragm;

a forming tool having a tool forming surface positionable for receiving a preform to be formed thereon between the first diaphragm and the second diaphragm when the first diaphragm and second diaphragm are mounted on the apparatus; and at least one inflatable member inflatable against the second side of the first diaphragm.

11. Apparatus for forming an article on a surface of a forming tool, comprising:

a first diaphragm mountable on the apparatus and conformable to a preform to be formed;

a second diaphragm mounted on the apparatus and conformable to a portion of the preform simultaneously with the first diaphragm, the second diaphragm having a first side for engaging the preform and a second side opposite the first side;

a forming tool having a tool forming surface positionable for receiving a preform to be formed thereon between the first diaphragm and the second diaphragm when the first diaphragm and second diaphragm are mounted on the apparatus; and at least one inflatable member inflatable against the second side of the second diaphragm.

12. Apparatus as in claim 1 adapted to receive and form a preform having a forming temperature, wherein the first and second diaphragms each have a softening temperature greater than the forming temperature of the preform.

13. Apparatus for forming an article, comprising:

a forming tool having a tool forming surface for receiving a preform to be formed thereon, the tool forming surface defining in part a first pneumatic cell;

a first diaphragm having a forming surface that is conformable to a preform mounted on the tool forming surface and that defines in part the first pneumatic cell, and a second surface opposite the forming surface that defines in part a second pneumatic cell pneumatically isolable from the first pneumatic cell;

a second diaphragm having a forming surface that is conformable to a preform mounted on the tool forming surface and that, with the tool forming surface and the forming surface of the first diaphragm, defines in part the first pneumatic cell, and a second surface opposite the forming surface that defines in part a third pneumatic cell pneumatically isolable from the first pneumatic cell.

14. Apparatus for forming an article, comprising:

a forming tool having a tool forming surface for receiving a preform to be formed thereon;

a diaphragm having a forming surface that is conformable to a first portion of a preform mounted on the tool forming surface, the diaphragm having a first side for engaging the first portion of the preform and a second side opposite the first side;

at least one inflatable member inflatable against a portion of the second side of the diaphragm that is adjacent the first portion of the preform but that is smaller than the first portion.

15. Apparatus as in claim 14, comprising a plurality of inflatable members inflatable against the second side of the diaphragm.

16. Apparatus for forming an article, comprising:

a forming tool having a tool forming surface for receiving a preform to be formed thereon;

a first diaphragm having a forming surface that is conformable to a preform mounted on the tool forming surface, the first diaphragm having a first side for engaging the preform and a second side opposite the first side;

a second diaphragm having a forming surface that is conformable to a preform mounted on the tool forming surface, the second diaphragm having a first side for engaging the preform and a second side opposite the first side; and at least one inflatable member inflatable against the second side of the second diaphragm.

17. Apparatus as in claim 16, further comprising:

at least one inflatable member inflatable against the second side of the second diaphragm.

18. Apparatus as in claim 17, comprising a plurality of inflatable members inflatable against the second side of the second diaphragm.

19. Apparatus as in claim 16, further comprising a workspace containing the tool forming surface, wherein the first diaphragm and second diaphragm each are inflatable into the workspace.

20. Apparatus as in claim 16, further comprising a lower support for supporting the forming tool and an upper support mounted in opposed relationship with the lower support, the first diaphragm being pneumatically sealable to the upper support and the second diaphragm being pneumatically sealable to the lower support.

21. Apparatus as in claim 16, further comprising a support for supporting the forming tool, the second diaphragm being pneumatically sealable to the support and pneumatically sealable to the first diaphragm.

22. Apparatus as in claim 16, wherein the first diaphragm includes a surface opposite the forming surface of the first diaphragm that is pneumatically isolable from the tool forming surface, the second diaphragm includes a surface opposite the forming surface of the second diaphragm that is pneumatically isolable from the tool forming surface, and the first side of the first diaphragm, the first side of the second diaphragm, and the tool forming surface together define in part a pneumatically isolable cell.

23. Apparatus as in claim 16, wherein the tool forming surface of the forming tool is nonplanar.

24. Apparatus as in claim 16, wherein the tool forming surface of the forming tool has double curvature.

25. Apparatus as in claim 14, wherein the diaphragm is a first diaphragm, the apparatus further comprising a second diaphragm having a forming surface that is conformable to the preform, the second diaphragm having a first side for engaging the preform and a second side opposite the first side, wherein the first side of the first diaphragm, the first side of the second diaphragm, and the tool forming surface together define in part a pneumatically isolable cell.

26. Apparatus as in claim 25, further comprising a workspace containing the tool forming surface, wherein the first diaphragm and second diaphragm each are inflatable into the workspace.

27. Apparatus as in claim 25, further comprising a workspace containing the forming tool, wherein the first diaphragm and second diaphragm each are inflatable into the workspace.

28. Apparatus as in claim 25, further comprising a support for supporting the forming tool, the second diaphragm being pneumatically sealable to the support and pneumatically sealable to the first diaphragm.

29. Apparatus as in claim 14, wherein the tool forming surface of the forming tool is nonplanar.

30. Apparatus as in claim 14, wherein the tool forming surface of the forming tool has double curvature.

31. Apparatus as in claim 13, further comprising a lower support for supporting the forming tool and an upper support mounted in opposed relationship with the lower support, the first diaphragm being pneumatically sealable to the upper support and the second diaphragm being pneumatically sealable to the lower support.

32. Apparatus as in claim 13, further comprising a workspace containing the forming tool surface, wherein the first diaphragm and second diaphragm each are inflatable into the workspace.

33. Apparatus as in claim 13, wherein the tool forming surface of the forming tool is nonplanar.

34. Apparatus as in claim 13, wherein the tool forming surface of the forming tool has double curvature.

35. Apparatus as in claim 7, further comprising a workspace containing the tool forming surface, wherein the first diaphragm and second diaphragm each are inflatable into the workspace.

36. Apparatus as in claim 7, further comprising a lower support for supporting the forming tool and an upper support mounted in opposed relationship with the lower support, the first diaphragm being pneumatically sealable to the upper support and the second diaphragm being pneumatically sealable to the lower support.

37. Apparatus as in claim 7, wherein the tool forming surface of the forming tool is nonplanar.

38. Apparatus as in claim 7, wherein the tool forming surface of the forming tool has double curvature.

39. Apparatus as in claim 4, further comprising a workspace containing the tool forming surface, wherein the first diaphragm and second diaphragm each are inflatable into the workspace 58.

40. Apparatus as in claim 4, wherein the tool forming surface of the forming tool is nonplanar.

41. Apparatus as in claim 4, wherein the tool forming surface of the forming tool has double curvature.

* * * * *